(12) United States Patent
Brownlow et al.

(10) Patent No.: US 8,725,914 B2
(45) Date of Patent: May 13, 2014

(54) MESSAGE SIGNALED INTERRUPT MANAGEMENT FOR A COMPUTER INPUT/OUTPUT FABRIC INCORPORATING PLATFORM INDEPENDENT INTERRUPT MANAGER

(75) Inventors: Sean Thomas Brownlow, Rochester, MN (US); James Arthur Lindeman, Austin, TX (US); Gregory Michael Nordstrom, Pine Island, MN (US); John Ronald Oberly, III, Rochester, MN (US); John Thomas O'Quin, II, Austin, TX (US); Steven Mark Thurber, Austin, TX (US); Timothy Joseph Torzewski, Rochester, MN (US)

(73) Assignee: International Business Machines Corporation, Armonk, NY (US)

( * ) Notice: Subject to any disclaimer, the term of this patent is extended or adjusted under 35 U.S.C. 154(b) by 2056 days.

(21) Appl. No.: 11/467,839

(22) Filed: Aug. 28, 2006

(65) Prior Publication Data

US 2008/0126648 A1 May 29, 2008

(51) Int. Cl.
*G06F 3/00* (2006.01)
*G06F 13/24* (2006.01)

(52) U.S. Cl.
USPC ............................................. 710/48; 710/260

(58) Field of Classification Search
USPC ................................................... 710/48, 260
See application file for complete search history.

(56) References Cited

U.S. PATENT DOCUMENTS

| 2005/0228923 | A1 | 10/2005 | Zimmer et al. |
| 2006/0253619 | A1 | 11/2006 | Torudbakken et al. |
| 2006/0282591 | A1 | 12/2006 | Krithivas |
| 2007/0061441 | A1 | 3/2007 | Landis et al. |

OTHER PUBLICATIONS

"Interrupt Architecture Enhancements in Microsoft Windows Vistas", 2004, Microsoft.
Nguyen, Tom L., "The MSI Driver Guide HOWTO" posted to MSI-HOWTO.txt on Aug. 12, 2003 by corbet and obtained from http://lwn.net/Articles/44139 on Sep. 19, 2006, 5 pages.

*Primary Examiner* — Hyun Nam
(74) *Attorney, Agent, or Firm* — Wood, Herron & Evans, LLP

(57) ABSTRACT

An apparatus, program product and method dynamically bind Message Signaled Interrupt (MSI) resources shared by a plurality of clients to an interrupt facility in an MSI-capable computer. In addition, management of such bindings may be implemented using a platform independent interrupt manager capable of managing multiple MSI bindings between MSI resources to an interrupt facility, and interfaced with an underlying hardware platform of a computer through platform-specific encapsulation program code.

28 Claims, 10 Drawing Sheets

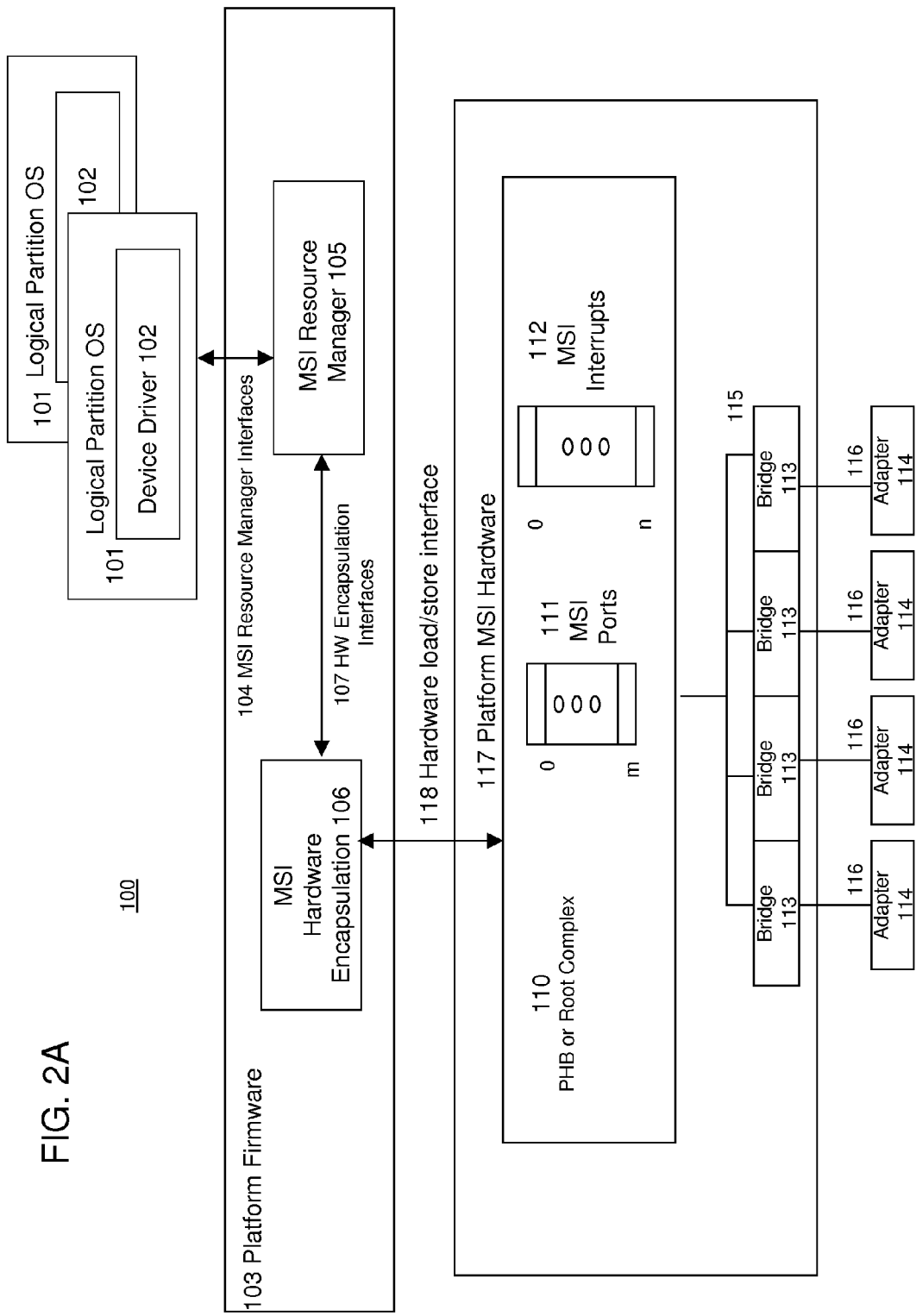

MSI State Table 310

| State Flags 311 | Bus# 312 | Dev# 313 | Func# 314 | MME 315 | Part.ID 316 |
|---|---|---|---|---|---|
| | | | .. | | |
| State Flags 311 | Bus# 312 | Dev# 313 | Func# 314 | MME 315 | Part.ID 316 |

0

Number MSI's Minus 1

Port Attributes Table 300

| |
|---|
| Port DMA Address 301 |
| Port Starting System Interrupt Number 302 |
| Port Starting MSI Data Value 303 |
| Number of MSI's 304 |
| Authorized Partitions 305 |

Figure 2B

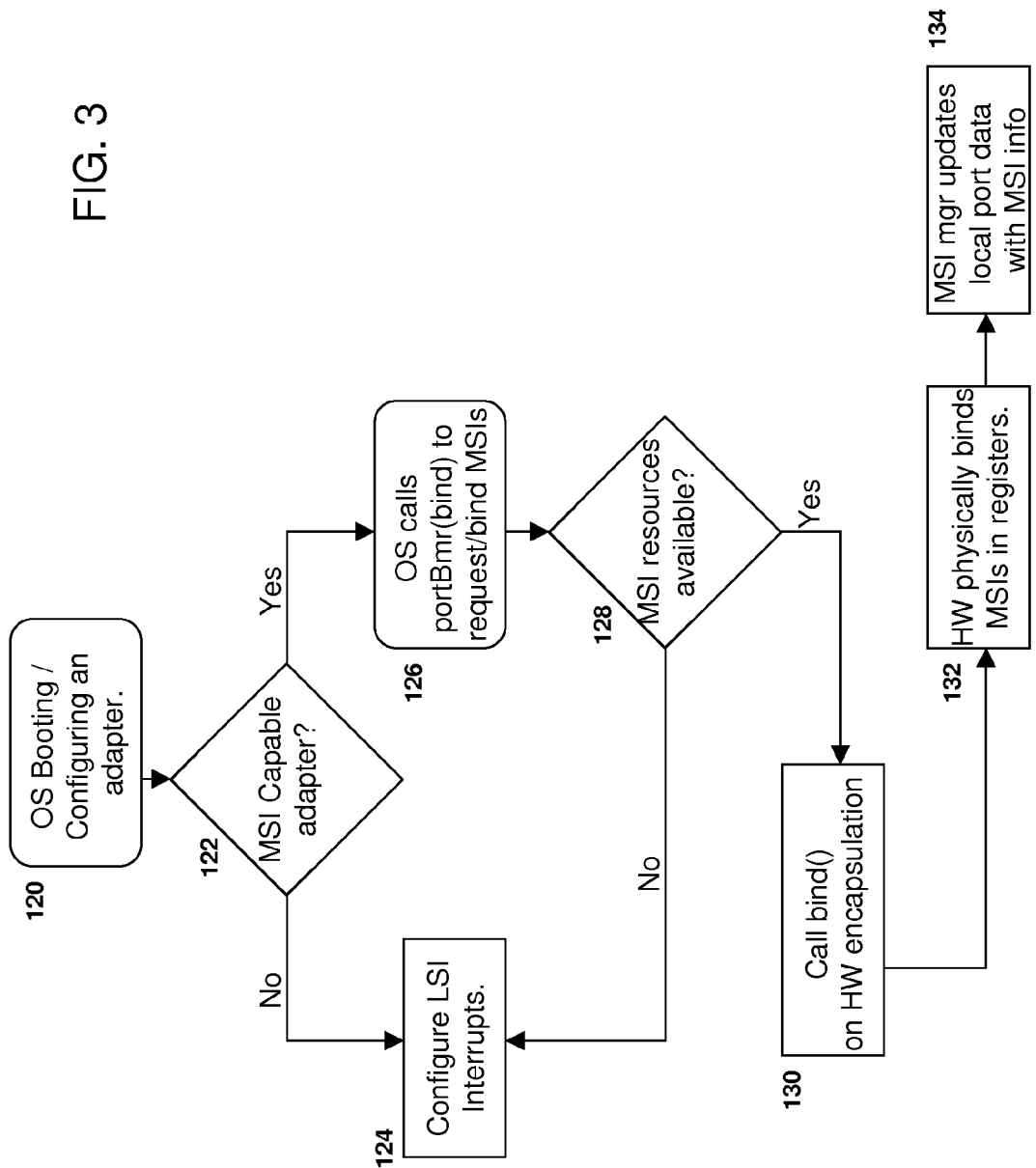

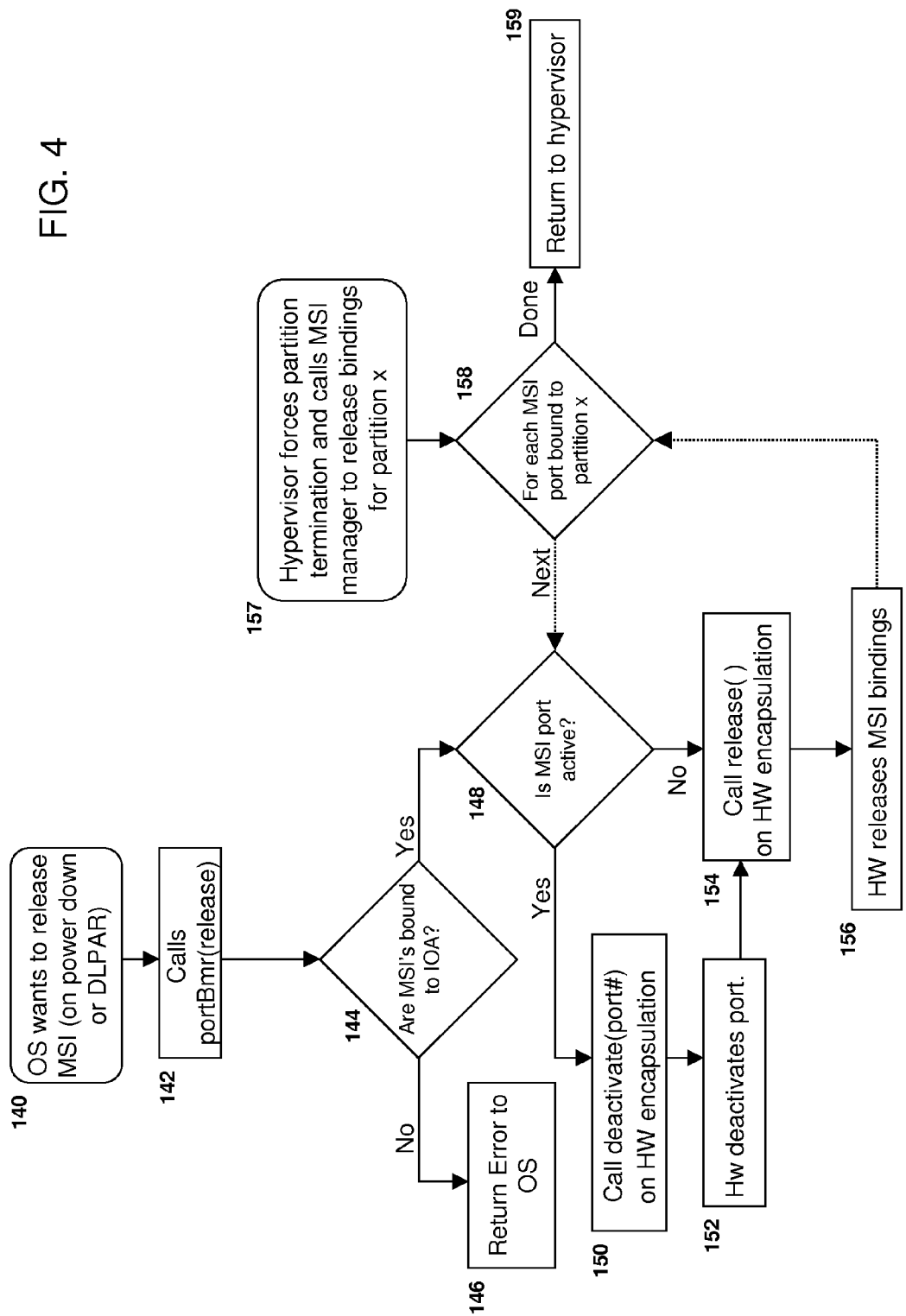

MESSAGE SIGNALED INTERRUPT MANAGEMENT FOR A COMPUTER INPUT/OUTPUT FABRIC INCORPORATING PLATFORM INDEPENDENT INTERRUPT MANAGER

CROSS-REFERENCE TO RELATED APPLICATIONS

This application is related to U.S. patent application Ser. No. 11/467,816, filed on even date herewith and entitled "MESSAGE SIGNALED INTERRUPT MANAGEMENT FOR A COMPUTER INPUT/OUTPUT FABRIC INCORPORATING DYNAMIC BINDING", the disclosure of which is incorporated by reference herein.

FIELD OF THE INVENTION

The invention relates to computers and computer software, and in particular, to processing interrupts generated in an input/output fabric of a computer or computer system.

BACKGROUND OF THE INVENTION

Given the continually increased reliance on computers in contemporary society, computer technology has had to advance on many fronts to keep up with both increased performance demands, as well as the increasingly more significant positions of trust being placed with computers. In particular, computers are increasingly used in high performance and mission critical applications where considerable processing must be performed on a constant basis, and where any periods of downtime are simply unacceptable.

Increases in performance often require the use of increasingly faster and more complex hardware components. Furthermore, in many applications, multiple hardware components, such as processors and peripheral components such as storage devices, network connections, etc., are operated in parallel to increase overall system performance.

Along with the use of these more complex components, the software that is used to operate these components often must be more sophisticated and complex to effectively manage the use of these components. For example, multithreaded operating systems and kernels have been developed, which permit computer programs to concurrently execute in multiple "threads" so that multiple tasks can essentially be performed at the same time. For example, for an e-commerce computer application, different threads might be assigned to different customers so that each customer's specific e-commerce transaction is handled in a separate thread.

One logical extension of a multithreaded operating system is the concept of logical partitioning, where a single physical computer is permitted to operate essentially like multiple and independent "virtual" computers (referred to as logical partitions), with the various resources in the physical computer (e.g., processors, memory, input/output devices) allocated among the various logical partitions. Each logical partition executes a separate operating system, and from the perspective of users and of the software applications executing on the logical partition, operates as a fully independent computer.

With logical partitioning, a shared program, often referred to as a "hypervisor" or partition manager, manages the logical partitions and facilitates the allocation of resources to different logical partitions. For example, a partition manager may allocate resources such as processors, workstation adapters, storage devices, memory space, network adapters, etc. to various partitions to support the relatively independent operation of each logical partition in much the same manner as a separate physical computer.

In both logically-partitioned and non-logically-partitioned computer systems, the management of the peripheral hardware components utilized by such systems also continues to increase in complexity. Peripheral components, e.g., storage devices, network connections, workstations, and the adapters, controllers and other interconnection hardware devices (which are referred to hereinafter as input/output (IO) resources), are typically coupled to a computer via one or more intermediate interconnection hardware devices components that form a "fabric" through which communications between the central processing units and the IO resources are passed.

In lower performance computer designs, e.g., single user computers such as desktop computers, laptop computers, and the like, the IO fabric used in such designs may require only a relatively simple design, e.g., using an IO chipset that supports a few interconnection technologies such as Integrated Drive Electronics (IDE), Peripheral Component Interconnect (PCI) or Universal Serial Bus (USB). In higher performance computer designs, on the other hand, the IO requirements may be such that a complex configuration of interconnection hardware devices is required to handle all of necessary communications needs for such designs. In some instances, the communications needs may be great enough to require the use of one or more additional enclosures that are separate from, and coupled to, the enclosure within which the central processing units of a computer are housed.

Often, in more complex designs, peripheral components such as IO adapters (IOA's) are mounted and coupled to an IO fabric using "slots" that are arrayed in either or both of a main enclosure or an auxiliary enclosure of a computer. Other components may be mounted or coupled to an IO fabric in other manners, e.g., via cables and other types of connectors, however, often these other types of connections are referred to as "slots" for the sake of convenience. Irrespective of the type of connection used, an IO slot therefore represents a connection point for an IO resource to communicate with a computer via an IO fabric. In some instances, the term "IO slot" is also used to refer to the actual peripheral hardware component mounted to a particular connection point in an IO fabric, and in this regard, an IO slot, or the IO resource coupled thereto, will also be referred to hereinafter as an endpoint IO resource.

Managing endpoint IO resources coupled to a computer via an IO fabric is often problematic due to the typical capability of an IO fabric to support the concurrent performance of multiple tasks in connection with multiple endpoint IO resources, as well as the relative independence between the various levels of software in the computer that accesses the IO resources. For example, many IO fabrics are required to support the concept of interrupts, which are asynchronous, and often sideband, signals generated by IO resources to alert the central processing complex of a computer of particular events.

In many conventional IO fabrics, interrupts are level sensitive in nature, whereby interrupt signals are generated by asserting a signal on a dedicated line or pin. With complex IO fabrics, however, the number of dedicated lines or pins that would be required to provide interrupt functionality for all of the IO resources connected to the fabric may be impractical. As a result, many more complex IO fabrics implement message-signaled interrupts (MSI's), which are typically implemented by writing data to specific memory addresses in the system address space.

As an example, the PCI-X and PCI-Express standards support MSI capabilities, with the PCI-Express standard requiring support for MSI for all non-legacy PCI-Express compatible IOA's. To fully support MSI, not only do the IOA's need to support MSI, MSI must be supported by the other hardware components in the IO fabric, e.g., PCI host bridges (PHB's), root complexes, etc., as well as by the host firmware, e.g., the BIOS, operating system utilities, hypervisor firmware, etc. Furthermore, these components must be sufficiently flexible to allow varying types of IOA's, and varying configurations and MSI signaling capabilities of both IO fabric hardware and IOA's, to be supported.

Also, when a PHB or root complex in a logically partitioned system supports the partitioning of IOA's or PCI functions within an IOA, administration of MSI interrupt facilities in the PHB or root complex across the partitions and PCI functions sharing them becomes even more complex. Host firmware typically must implement MSI management functions and policies that adapt to varying adapter capabilities and configurations on a single PHB, using the PHB implementation. Furthermore, such management must accommodate the needs of multiple clients, be they operating systems, partitions, device drivers, etc., to avoid inter-client resource conflicts and ensure fair allocation among multiple clients.

One basic function required to provide MSI support is that of creating bindings between MSI resources and an interrupt facility of an underlying hardware platform. A binding represents a mapping between an MSI resource and an interrupt facility to ensure that an interrupt signaled by an MSI resource will be routed to an appropriate client via the interrupt facility. In many designs, for example, an interrupt facility will allocate specific interrupt "ports" to various clients, such that an MSI binding ensures that an interrupt signaled by an MSI resource allocated to that client will be directed to the port in the interrupt facility associated with that client.

A significant issue with respect to logically partitioned computers as well as more complex non-partitioned computers is that of high availability. Such computers are often required to support dynamic reconfiguration with minimal impact on system availability. In logically partitioned computers, for example, logical partitions may be terminated and reactivated dynamically, without impacting the availability of the services provided by other logical partitions resident on a computer. In addition, it may be necessary to reallocate system resources between logical partitions, e.g., to increase the capabilities of heavily loaded partitions with otherwise unused resources allocated to other partitions. Still further, many designs support the ability to perform concurrent maintenance on IOA's and other resources, including adding, replacing (e.g., upgrading), or removing IOA's dynamically, and desirably with little or no impact on system availability. Error recovery techniques may also dynamically reallocate or otherwise alter the availability of system resources. In each of these instances, MSI facilities may need to be adjusted to accommodate changes in the underlying hardware platform and/or in the allocation of system resources to different partitions in the computer.

An additional concern with respect to MSI support arises due to the wide variety of underlying hardware platforms that may utilize MSI. In many instances, operating systems and device drivers are desirably portable to different hardware platforms. If MSI management responsibility is allocated to an operating system or device driver, portability suffers due to the need for the operating system/device driver to account for variabilities in hardware platforms. Likewise, MSI management via a management facility that is separate from an operating system or device driver, e.g., as might be implemented in firmware, is likewise often unduly complicated due to a need to account for hardware platform variability.

SUMMARY OF THE INVENTION

The invention addresses these and other problems associated with the prior art by providing in one aspect an apparatus, program product and method that utilize a platform independent interrupt manager capable of managing multiple Message Signaled Interrupt (MSI) bindings between MSI resources to an interrupt facility. In particular, a platform independent interrupt manager consistent with the invention is interfaced with an underlying hardware platform of a computer through platform-specific encapsulation program code. As such, an interrupt manager may be developed that operates independent of the particular hardware capabilities of a particular hardware platform, resulting in an interrupt manager that may be readily used with multiple hardware platform designs.

These and other advantages and features, which characterize the invention, are set forth in the claims annexed hereto and forming a further part hereof. However, for a better understanding of the invention, and of the advantages and objectives attained through its use, reference should be made to the Drawings, and to the accompanying descriptive matter, in which there is described exemplary embodiments of the invention.

BRIEF DESCRIPTION OF THE DRAWINGS

FIG. 2A is a block diagram illustrating the MSI-related facilities in the computer of FIG. 1.

FIG. 2B is a block diagram illustrating an exemplary implementation of internal data structures for use in the MSI Manager referenced in FIG. 2A.

FIG. 3 is a flowchart illustrating the program flow of a bind routine capable of being executed by the computer of FIG. 1.

FIG. 4 is a flowchart illustrating the program flow of a release routine capable of being executed by the computer of FIG. 1.

DETAILED DESCRIPTION

Figure 1:
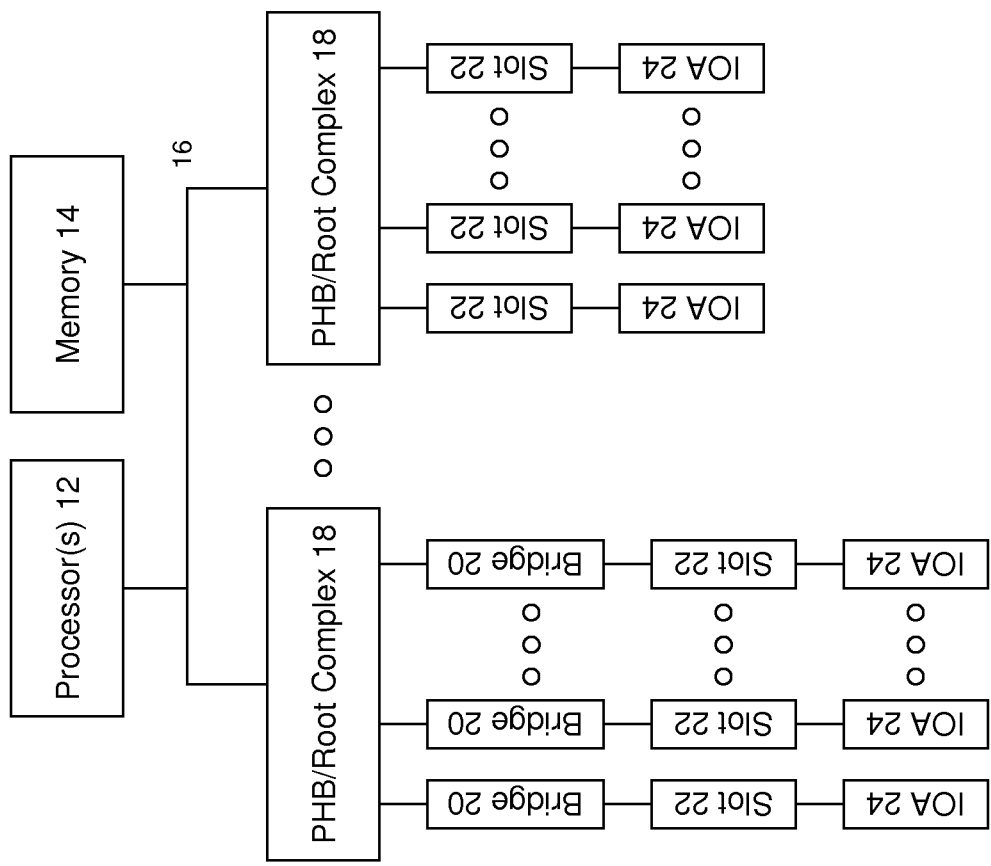
FIG. 1 is a block diagram of the principal hardware components in an MSI-compatible computer consistent with the invention.

The embodiments discussed hereinafter manage bindings between MSI resources and an interrupt facility to facilitate sharing of MSI resources by a plurality of clients. As will become more apparent below, some embodiments consistent with the invention support dynamic binding management, whereby MSI bindings may be dynamically created at runtime, and specifically in response to client requests. In addition, in some embodiments consistent with the invention, the management of MSI bindings may be performed by a platform independent interrupt manager that is interfaced with a hardware platform via a platform-specific encapsulation program. It will be appreciated, however, that dynamic binding functionality and platform independence may be implemented separate from one another in some embodiments of the invention.

The embodiment described specifically hereinafter utilizes an MSI manager program that is implemented as a component of a host system's firmware, and that is capable of administering individual MSI hardware interrupts and ports in an interrupt facility, and binding a plurality of MSI interrupts in power of 2 multiples to an MSI port (DMA address). The aforementioned MSI manager program additionally authorizes individual logical partitions to use MSI hardware facilities of a shared PCI host bridge or root complex in a logically partitioned system. Furthermore, the MSI manager program is implemented as a standalone programming entity (e.g., C++ class) that is portable to different hardware platforms and interfaced via a hardware encapsulation program described in greater detail below.

The MSI manager described herein is generally a component of platform or system firmware, such as the BIOS of a desktop computer in a non-partitioned computer; or the hypervisor or partition manager firmware in a logically partitioned computer. Alternatively, the MSI Manager may be a component of an operating system, providing MSI administration as an OS utility to device drivers and using BIOS to provide the functionality of a hardware encapsulation program.

The MSI manager may be used in connection with a number of different interrupt facilities. In this context, an interrupt facility is comprised of hardware logic to present an interrupt signal from an IOA to a processor. The interrupt facility typically operates as a presentation layer to various clients to enable clients to configure and access MSI resources, e.g., Open PIC variants, MPIC, APIC, IBM PowerPC Interrupts, and other such processor interrupt controllers as may exist in varying underlying processor architectures. An interrupt facility includes hardware logic capable of communicating an input interrupt signal from an MSI or LSI source to processor interrupt receiving hardware, and functionality for the processor to then communicate the interrupt to a client program that manages the IOA. Typically incorporated within an interrupt facility are MSI resources, such as MSI interrupt vectors, that are mapped or bound to a set of MSI ports, wherein the MSI ports are DMA addresses that receive MSI DMA messages from an IOA signaling an MSI interrupt. A client, in this regard, may be any program code that is capable of configuring IOA's to utilize the interrupt facility MSI resources established for such IOA's, e.g., an operating system, a system BIOS, a device driver, etc. A client may be resident in a logical partition in a partitioned environment, or may be resident elsewhere in a non-partitioned environment. One example of a client as utilized in the embodiments discussed below is a partition operating system, which utilizes firmware-provided libraries also known as Run Time Abstraction Services (RTAS).

A hardware platform, in this context, refers to any hardware that manages one or more MSI resources for one or more IOA's disposed in an IO fabric. A hardware platform, for example, may include a PCI host bridge that manages interrupts for any IOA's coupled to the PCI bus driven by the PCI host bridge. A hardware platform may also include a root complex as is used in a PCI-Express environment, which is tasked with managing interrupts for any IOA's coupled to the root complex.

The herein-described MSI manager typically includes programming functions or calls to enable a client to administer (e.g., allocate, release, and/or modify) MSI hardware resources, from amongst either MSI resources dedicated to one IOA and client, or MSI resources shared among several IOA's and clients. In a non-partitioned computer, these programming functions may be implemented, for example, with kernel or platform firmware (e.g., BIOS) library calls. In a logically partitioned system, these functions may be implemented, for example, with hypervisor calls.

In addition, as noted above, the MSI manager is interfaced with the hardware platform via an MSI hardware encapsulation program that abstracts the actual hardware implementation to allow the MSI manager to be independent of any particular hardware implementation. The encapsulation program presents provides function calls that render the underlying hardware implementation transparent to the MSI Manager, which thereby allows the MSI manager program to be portable to other hardware implementations unchanged.

The hardware encapsulation program performs all actual hardware register access and manipulations, on behalf of the MSI manager. In addition, the hardware encapsulation program calculates and programs the MSI manager with abstract parameters that describe the MSI hardware capabilities without MSI manager knowledge of actual hardware structures, including, for example, the number of MSI DMA ports, the number of MSI interrupts and how they can be associated with the hardware MSI port addresses, and the system interrupt vectors that are associated with individual MSI interrupts. In an object-oriented programming implementation, the MSI manager may be implemented as a C++ class (or "object"), with the hardware encapsulation program providing abstract parameters to the MSI manager as class constructor parameters. These abstract parameters are desirably independent of the actual hardware design, which is known by the encapsulation program, but otherwise unknown to the MSI manager.

The hardware encapsulation may also include programming functions or calls exposed to the MSI manager to allow the MSI manager to indirectly control and set values in the MSI hardware facilities without direct knowledge of the hardware design. These programming functions may be implemented internally by the hardware encapsulation program as appropriate to varying hardware implementations without requiring any changes to the MSI manager.

The herein-described MSI manager may be allocated to a particular host bridge or root complex, or any other hardware device that manages MSI interrupts for one or more IOA's. In the embodiments discussed below, for example, the MSI manager may be allocated to a PCI Host Bridge or a PCI-Express root complex, and thus may be utilized in an IO fabric based at least in part upon PCI, PCI-X or PCI-Express. As will become more apparent below, however, embodiments consistent with the invention may be used in connection with IO fabrics including an innumerable number and types of IO fabric elements, including, for example, bridge devices, hub devices, switches, connectors, host devices, slave devices, controller devices, cables, modems, serializers/deserializers, optoelectronic transceivers, etc.

Among other benefits, the herein-described techniques facilitate the implementation of slot or resource level partitioning in a logically-partitioned computer, whereby individual IO resources or slots may be bound to specific logical partitions resident in a logically-partitioned computer. It will be appreciated, however, that the techniques described herein may be used in non-logically partitioned environments, as well as with other granularities of resource partitioning, e.g., bus or enclosure level.

Turning now to the Drawings, wherein like numbers denote like parts throughout the several views, FIG. 1 illustrates the principal hardware components in an MSI-compatible computer system 10 consistent with the invention. Computer 10 generically represents, for example, any of a number of multi-user computers such as a network server, a midrange computer, a mainframe computer, etc., e.g., an IBM eServer computer. However, it should be appreciated that the invention may be implemented in other computers and data processing systems, e.g., in single-user computers such as workstations, desktop computers, portable computers, and the like, or in other programmable electronic devices (e.g., incorporating embedded controllers and the like), as well as other multi-user computers including non-logically-partitioned computers.

Computer 10 generally includes a Central Electronics Complex (CEC) that incorporates one or more processors 12 coupled to a memory 14 via a bus 16. Each processor 12 may be implemented as a single threaded processor, or as a multithreaded processor, and at least one processor may be implemented as a service processor, which is used to run specialized firmware code to manage system initial program loads (IPL's), and to monitor, diagnose and configure system hardware. Generally, computer 10 will include one service processor and multiple system processors, which are used to execute the operating systems and applications resident in the computer, although the invention is not limited to this particular implementation. In some implementations, a service processor may be coupled to the various other hardware components in the computer in manners other than through bus 16.

Memory 14 may include one or more levels of memory devices, e.g., a DRAM-based main storage, as well as one or more levels of data, instruction and/or combination caches, with certain caches either serving individual processors or multiple processors as is well known in the art. Furthermore, memory 14 is coupled to a number of types of external devices via an IO fabric. In the illustrated implementation, which utilizes a PCI-X or PCI-Express-compatible IO fabric, the IO fabric may include one or more PCI Host Bridges (PHB's) and/or one or more root complexes 18. Each PHB/root complex typically hosts a primary PCI bus, which may necessitate in some instances the use of PCI-PCI bridges 20 to connect associated IO slots 22 to secondary PCI buses. IO slots 22 may be implemented, for example, as connectors that receive a PCI-compatible adapter card, or PCI adapter chips embedded (soldered) directly on the electronic planar that incorporates the PCI-PCI bridge and/or PHB, collectively referred to as IOA's 24.

A PCI-based interface supports memory mapped input/output (MMIO). As such, when computer 10 implements a logically-partitioned environment, the logical partition operating systems may be permitted to "bind" processor addresses to specific PCI adapter memory, for MMIO from a processor 12 to the IOA's, and addresses from memory 14 to the IOA's, to enable IOA's to DMA to or from memory 14.

Also in the illustrated embodiment, a hot plug controller is desirably associated with each IO slot, and incorporated into either PHB's 18 or PCI-PCI bridges 20, to allow electrical power to be selectively applied to each IO slot 22 independent of the state of power to other IO slots 22 in the system. In addition, in some embodiments, groups of IO fabric elements may be integrated into a common integrated circuit or card. For example, multiple PCI-PCI bridges 20 may be disposed on a common integrated circuit.

With reference to FIG. 2A, a logically partitioned implementation of computer 10 is illustrated at 100, including a plurality of logical partition operating systems 101 within which are disposed a plurality of device driver programs 102, each of which configured to control the operation of one of a plurality of IOA's 114. The operating system partitions are understood to execute programs in a conventional computer processor and memory not included in the figure.

In addition to the processor and memory, the computer hardware includes an IO fabric that connects the IOA's 114 to the computer processor and memory and that further includes message signaling hardware 117 that is accessible to both the IOA's and programs executing in the computer processor. In the illustrated embodiment the MSI hardware 117 is a component of a PCI host bridge (PHB) or root complex 110, which may be referred to hereinafter simply as a PHB. The IOA's 114 are connected to the MSI hardware over a PCI bus 115 connected to the PHB 110 or, alternatively, a PCI bus 116 connected to the PHB PCI bus 115 through a PCI bridge 113. It will be apparent to one skilled in the art that forms of IO hardware other than PCI host bridges or root complexes and PCI adapters may utilize message signaled interrupt mechanisms in the manner described by the present invention. Furthermore, multiple PHB's or root complexes may be utilized in a given computer in some embodiments.

The MSI hardware 117 includes MSI ports 111 and MSI Interrupts 112 that are combined by the MSI hardware to signal a unique interrupt to a device driver 102 in a logical partition operating system 101. Each of the plurality of MSI ports 111 may be combined with a plurality of MSI interrupts 112 that are sequentially related. For example, an MSI port 111 identified as "Port 0" may be combined with a single MSI interrupt 112 numbered '0', or may be combined with a group of MSI interrupts 112 numbered 8 through 15 such that any of the sequential group of these eight interrupts may be signaled in combination with the MSI "port 0".

In the illustrated embodiment utilizing a PCI host bridge, the IOA's 114 signal an MSI interrupt as a DMA write operation on the PCI bus 115 or 116 in which the DMA write address selects a particular MSI port 111, and the DMA write data selects a particular MSI interrupt 112. When configuring an IOA 114 for IO operations, a client such as an operating system 101 or device driver 102 programs the IOA 114 with the DMA address identity of an MSI port 112 and an ordinal range of sequential MSI interrupts 111 that the IOA 114 may individually present as the DMA data in association with that MSI port DMA address.

For example, the PCI function configuration space of an MSI-compatible IOA may incorporate message control, message data, and message address (port) registers. A client may be configured to set these registers to define MSI parameters to each function using MSI. Functions typically signal an MSI interrupt as a DMA write to the PHB, in which the DMA address is an address, or MSI "port," defined by the PHB, and that the PHB decodes as an MSI target. The DMA data is a 16-bit integer, or "interrupt number," that selects an interrupt vector associated with the MSI port address. The specific interrupt vector selected is typically implementation specific within the PHB. The PHB uses the combination of port address and interrupt number to associate the interrupt from the function with an interrupt vector the PHB can signal to the processor. For example, for Power5 and Power6-compatible PHB's, the port address and interrupt number in the MSI DMA may choose an XIVR. In hardware platforms with MPIC interrupt controllers, the port address and interrupt number may choose an MPIC interrupt.

In the illustrated implementation, a function message data register may be used to define interrupt numbers that function may signal to the PHB. This may be a specific interrupt number, or may be a range of interrupt numbers, depending on a 3-bit Multiple Message Enable field in the message control register. This field encodes the number of interrupts defined to this function in powers of 2 ranging from 1 to 32 (000b to 101b). When multiple message enable (MME) is '000b', the function may present only that specific interrupt number as it is stored in the message data register. For example, if the message data register is set to 0xC7, the function may signal only the interrupt that the PHB associates with 0xC7 and the port address programmed into the message address (port) register.

When MME is non-zero, the function may present interrupts in a power of 2 range of interrupt numbers using all combinations of the low order bits of the message data register that are defined by the MME value. For example, if the message data register is '0xC8' and MME is set to '010b' (4 interrupts), that function may signal four interrupts ranging from 0xC8 to 0xCB.

The illustrated embodiment also includes platform firmware 103 that contains an MSI Resource Manager 105, or MSI manager, and MSI Resource Manager Interfaces 104. It will be apparent to one skilled in the art that the platform firmware 103 may be implemented in any of a hypervisor, operating system kernel utility, or basic IO configuration firmware (such as a BIOS) of a computer system, or in practically any other software or firmware implemented in a logically partitioned or non-logically partitioned computer. The MSI manager 105 is aware of a plurality of "m" MSI ports 111 and a plurality of "n" MSI interrupts 112 implemented in the platform MSI hardware 107, wherein n is greater than or equal to m. The MSI manager is further aware of the association of the MSI interrupts to the interrupt presentation semantics of the computer and MSI signaling hardware architecture, so as to instruct the operating system or configuration program with the values that correlate the signaling hardware with the configuration values and computer interrupt presentation mechanisms.

The MSI manager 105 determines associations of MSI interrupts 111 to particular MSI ports 112 that derive a plurality of associations, or "bindings", of the n MSI interrupts to the m MSI ports. Each of the plurality of bindings is suitable for use with an individual interrupting IOA 114. The MSI manager 105 thereby functions as a service to the logical partition operating systems 101 or device drivers 102 to administer MSI ports 111 and MSI interrupts 112 to make these available to an individual device driver 102 when needed to configure an IOA 114 for message signaled interrupts.

It is particularly a function of the MSI manager 105 to administer the plurality of MSI ports 111 and MSI interrupts 112 so as to facilitate sharing these resources among a plurality of device drivers 102 within a single operating system partition 101, or amongst a plurality of device drivers 102 within a plurality of partition operating systems 101. The MSI manager interfaces 104 provides a means to administer these resources such that an individual client, e.g., an operating system 101 or device driver 102, is unaware of the totality of MSI ports 111 and MSI interrupts 112 provided in the MSI hardware 107, or those MSI resources available to or in use by other operating systems 101 or device drivers 102.

The MSI manager interfaces 104 are comprised of programming function calls to identify, allocate, deallocate, activate, and deactivate the MSI signaling resources, MSI ports 111 and MSI interrupts 112. An operating system 101 or device driver 102 invokes these function calls to indicate to the MSI manager 105 what MSI resources are required by an individual IOA 114, and to determine what MSI resources are then available to program the IOA's 114 for the purpose of signaling message interrupts.

The platform firmware 103 also includes an MSI hardware encapsulation program 106 and hardware encapsulation interfaces 107. It is the function of the hardware encapsulation program 106 and hardware encapsulation interfaces 107 to provide an abstraction of the particular hardware implementation of MSI ports 111 and MSI interrupts 113 so as to insulate the MSI manager 105 from these specifics. This enables a singular programming implementation of an MSI manager that can function unchanged in a plurality of different computer systems having differing hardware implementations of platform MSI hardware 117.

At the direction of the MSI manager 105 utilizing the hardware encapsulation interfaces 107, the hardware encapsulation program 106 communicates directly with the underlying platform MSI hardware to perform the specific hardware association of MSI interrupts 111 to MSI ports 112, and to perform hardware operations that activate or deactivate the MSI ports for message signaling by the IOA's 114. The hardware encapsulation program may utilize a hardware load/store interface 118, e.g., a memory mapped load/store IO interface, for programmatic access to hardware MSI facilities.

The hardware encapsulation program 106 also provides the programmatic operation within the hypervisor, operating system kernel utility, or IO configuration firmware to create an MSI manager program and data structures in association with each pool of MSI Ports 111 and MSI interrupts 112 that are mutually combinable within the design of the platform MSI hardware 107, e.g., on a PHB-by-PHB basis.

A number of the components illustrated in FIG. 2A, e.g., the logical partition operating system 101, the device driver 102, the MSI manager 105, and the hardware encapsulation program 106, are implemented in program code, generally resident in software or firmware executing in computer 100. In general, the routines executed to implement the embodiments of the invention, whether implemented as part of an operating system or a specific application, component, program, object, module or sequence of instructions, or even a subset thereof, will be referred to herein as "computer program code," or simply "program code." Program code typically comprises one or more instructions that are resident at various times in various memory and storage devices in a computer, and that, when read and executed by one or more processors in a computer, cause that computer to perform the steps necessary to execute steps or elements embodying the various aspects of the invention. Moreover, while the invention has and hereinafter will be described in the context of fully functioning computers and computer systems, those skilled in the art will appreciate that the various embodiments of the invention are capable of being distributed as a program product in a variety of forms, and that the invention applies equally regardless of the particular type of signal bearing media used to actually carry out the distribution. Examples of signal bearing media include but are not limited to tangible, recordable type media such as volatile and non-volatile memory devices, floppy and other removable disks, hard disk drives, magnetic tape, optical disks (e.g., CD-ROMs, DVDs, etc.), among others, and transmission type media such as digital and analog communication links.

In addition, various program code described hereinafter may be identified based upon the application or software component within which it is implemented in a specific embodiment of the invention. However, it should be appreciated that any particular program nomenclature that follows is used merely for convenience, and thus the invention should not be limited to use solely in any specific application identified and/or implied by such nomenclature. Furthermore, given the typically endless number of manners in which computer programs may be organized into routines, procedures, methods, modules, objects, and the like, as well as the various manners in which program functionality may be allocated among various software layers that are resident within a typical computer (e.g., operating systems, libraries, API's, applications, applets, etc.), it should be appreciated that the invention is not limited to the specific organization and allocation of program functionality described herein.

Those skilled in the art will recognize that the exemplary environments illustrated in FIGS. 1 and 2A are not intended to limit the present invention. Indeed, those skilled in the art will recognize that other alternative hardware and/or software environments may be used without departing from the scope of the invention.

With reference now to FIG. 2B, an MSI manager consistent with the invention may incorporate one or more internal data structures that describe the platform hardware in an abstract manner that is independent of varying hardware implementations. For example, as shown in FIG. 2B, one suitable set of data structures includes a port attributes table 300 that contains the basic abstract parameters describing an MSI port passed to an MSI manager constructor: a port DMA address 301, a port starting system interrupt number 302, a port starting MSI data value 303, and a number of MSI's associated with that port 304.

Optionally, an MSI manager may also include in the port attributes table 300 a list of logical partitions, shown at 305, that are authorized to use that MSI port and MSI's that can be bound to that port, as part of MSI manager authority management. Alternatively, an MSI manager may utilize other authority management functions of a hypervisor, such as the hypervisor's authority mechanisms to authorize a logical partition to access PHB or PCI slot resources for other system functions. In such alternative embodiments, the MSI manager need not directly incorporate partition authority parameters in the MSI port attributes or other internal structures.

In association with the MSI port attributes and hardware MSI interrupts, a MSI manager may also internally construct an MSI state table 310 to administer bindings of MSI interrupts to an MSI port. The MSI state table 310 may be implemented as an array of MSI state entries, one for each MSI that may be associated with the MSI's managed by that MSI manager. An MSI state flags vector 311 includes states such as whether that MSI is allocated or available, and whether it is activated or deactivated at any given instant. An MSI Bus# value 312, Dev# value 313, and Func# value 314 record the PCI bus/device/function number to which an MSI is allocated after a client has bound that MSI through the MSI manager. Similarly, an MME value 315 records the number of consecutive MSI interrupts bound as a group including this MSI. A partition ID 316 records the particular logical partition for which an MSI is bound, when the MSI manager is implemented in a logically partitioned computer system.

It will be appreciated by one of ordinary skill in the art that the hardware abstraction and MSI state parameters may be implemented as tables, as shown in FIG. 2B, as Object Oriented programming classes, such as in the C++ language, or in other manners known in the art.

Additionally, a single MSI manager class may contain multiple port attribute tables and associated MSI state tables, in which each port attribute table is associated with a single MSI state table. Each such pair of tables would thereby represent a single MSI port and the MSI's that can be bound to that port. Such an embodiment would thereby enable a single MSI manager that manages multiple MSI ports each individually associable with a particular range of MSI's. In another embodiment, an MSI manager may have multiple MSI port attribute tables and a single MSI state table, with the MSI state flags in the MSI state table including an index or identifier that identifies which of the multiple ports an MSI or set of consecutive MSI's is bound. Such an embodiment would enable an MSI manager to manage multiple MSI ports that are bindable to arbitrary subsets of a single range of MSI interrupts. The implementation of constructor parameters to provide lists of port attribute parameters as opposed to parameters describing a single MSI port would be apparent to one of ordinary skill in the art having the benefit of the instant disclosure.

One specific implementation of an MSI manager, supporting the dynamic binding of MSI resources to an interrupt facility, is described in greater detail below in connection with FIGS. 3-9B. In this implementation, an MSI manager is used to handle all activation, deactivation, release and bind actions involving MSI ports in the interrupt facility and MSI resources associated with IOA's under a PHB or root complex with which the MSI manager is associated. An MSI manager is constructed for each MSI-capable PHB or root complex with parameters specifying the MSI characteristics of the PHB or root complex provided during the construction of the MSI manager.

The MSI manager is an adjunct object associated with a PHB or root complex, but has no direct awareness of the PHB/root complex hardware implementation. Once constructed, the MSI manager uses hardware encapsulation interfaces to access a hardware encapsulation program and indirectly establish MSI binding and activation. By doing so, the MSI manager is portable to other PHB implementations.

The MSI manager contains logical bindings for MSI's to MSI Validation Table Entries (MVE's) or ports, a current available shared 'pool' of MSI's, and unused MSI port addresses. In addition, the MSI manager ensures a set of policies associated with MSI's, and provides support for binding MSI's to MVE's, releasing MSI's from current MVE bindings, activating MVE's to allow DMA writes to bound MSI port addresses, deactivating MVE's during partition reboots and error flows, and modifying current MSI bindings to specific MVE's or ports.

In one implementation, for example, the MSI manager implements an MSI management policy that assures minimum MSI resources of one MVE and eight MSI's for each PE. At the same time, the MSI manager may allow for clients to dynamically bind additional MSI's to optimize IOA performance. For PHB's supporting more than one PE, the MSI manager may manage MVE's and MSI's beyond the minimum per PE requirement as a pool shared by all clients (e.g., partitions) having PE's on that PHB. The MSI manager may allocate these pooled resources on a first come, first served basis, which insures that all PE's can function. However, PCI device performance may vary from activation to activation as pooled MSI's are more or less available, based on the dynamic allocation state of MSI's to partitions sharing these resources.

Each MVE typically includes information to validate the DMA master as having authority to DMA to this port, as well as the information necessary to translate a valid MSI interrupt number into an appropriate processor interrupt (e.g., to a particular XISR). A PHB that supports endpoint partitioning in a logically partitioned environment will typically provide an MVE for each endpoint. Thus, a PHB generally provides multiple MVE's to enable multiple partitionable endpoints (PCI devices assigned to different logical partitions) to share PHB MSI resources.

In addition, each MSI interrupt that a function can signal typically correlates to a unique interrupt in the hardware platform interrupt space. In some platforms, for example, the translation may correlate a valid MSI interrupt number with an XIVR in the PHB, which the PHB then signals as an XISR to a processor. The combination of a PHB ID and interrupt number in an XISR on that PHB therefore produce a platform unique interrupt number. Generally, a PHB providing multiple MVE's allows any MVE to address a subset of the total MSI XIVR's that PHB provides. Platform and partition firmware make that association dynamically to suit the configuration and capabilities of the IOA's connected through that PHB. Dynamic binding as described herein desirably enables binding at partition boot time, as well as following external IO drawer or PCI slot hot plug replacement, or dynamic logical partition add, of IOA's on a running system.

The MSI manager supports a client interface that includes three primary types of calls. Bind/release/modify calls support the dynamic creation, destruction and modification of bindings between MSI resources and MVE's or MSI ports in the interrupt facility. Activate/deactivate calls support the dynamic activation and deactivation of MVE's or MSI ports, and query calls support the retrieval of logical information about the current MSI availability and bindings. FIGS. 3-8 illustrate the operation of these various types of calls, with the assumption in this instance that the underlying computer is a logically-partitioned computer having IOA's that operate as partitionable endpoints (PE's) that may allocated to specific partitions. In addition, the partitions, or more specifically, the operating systems resident therein, function as the clients to the MSI processing functionality in the hypervisor or partition manager firmware resident in the computer.

FIG. 3, for example, illustrates the sequence of operations that occur in connection with a bind operation. As shown in block 120, a bind operation is initiated by an operating system or other client attempting to boot or configure an IOA, and includes a determination in block 122 of whether the adapter is MSI capable. If not, control passes to block 124, where conventional level-sensitive interrupt (LSI) configuration is performed. Otherwise, control passes to block 126, whereby the operating system makes a hypervisor MSI service portBmr( ) call to the MSI manager with a value of zero as a logical port and some number of MSI's to configure an IOA. The MSI manager then determines in block 128 if there are enough MSI resources available for the request. If not, the MSI manager returns the call to the partition operating system, which then uses conventional LSI interrupts for the IOA (block 124). Otherwise, the MSI manager passes control to block 130 to determine the next available physical hardware port to bind the number of MSI's to, and call a bind( ) routine on the hardware encapsulation class, which in turn physically binds the MSI's to the available port (block 132). Next, the MSI manager updates all local data for the port regarding the newly bound MSI's and returns a successful result to the operating system (block 134).

FIG. 4 illustrates the sequence of operations that occur in connection with a release operation. As shown in block 140, a release operation is initiated when a partition operating system needs to release a current adapter's MSI binding, such as when a partition power down or Dynamic Logical Partitioning (DLPAR) operation is performed on a slot to release it. In block 142, the operating system makes a Hypervisor MSI service portBmr( ) call with the logical port number for the MSI's to be released, and a zero value for the number of MSI's parameter. Next, in block 144, the MSI manager determines if the MSI's are bound to the identified port for that IOA, i.e., the MSI manager performs an authority check for the operating system to ensure the operating system has authority to perform the operation. If not, the MSI manager returns an error to the operating system in block 146. Otherwise, the MSI manager determines whether the MSI port is active (block 148), and if so, passes control to block 150 to implicitly deactivate the port through the hardware encapsulation class via a deactivate( ) call, specifying the appropriate port number.

In response to this call, the hardware encapsulation class deactivates the port (block 152). Upon completion of block 152, or if the MSI port is determined to not be active in block 148, control passes to block 154, whereby the MSI manager calls a release( ) routine on the hardware encapsulation class, which in turn physically releases the MSI bindings from the hardware (block 156). The release operation is then complete.

As also shown in FIG. 4, in embodiments utilizing logical partitioning, a hypervisor may force termination of a logical partition such that the partition does not initiate or complete release of MSI bindings in the manner illustrated beginning at block 140. Instead, as shown in block 157, a hypervisor may directly call the MSI manager through an internal hypervisor interface to the MSI manager to release bindings associated with a partition identified by a partition id, "x". In response, and as shown in block 158, the MSI manager scans its list of MSI bindings for bindings associated with the partition id "x". If any such bindings exist, the MSI manager passes control to block 148 to initiate release of the associated binding. Then, as shown in block 159, when all bindings associated with the partition id "x" are released, the MSI manager returns to the hypervisor, signaling that the release is complete.

Figure 5:
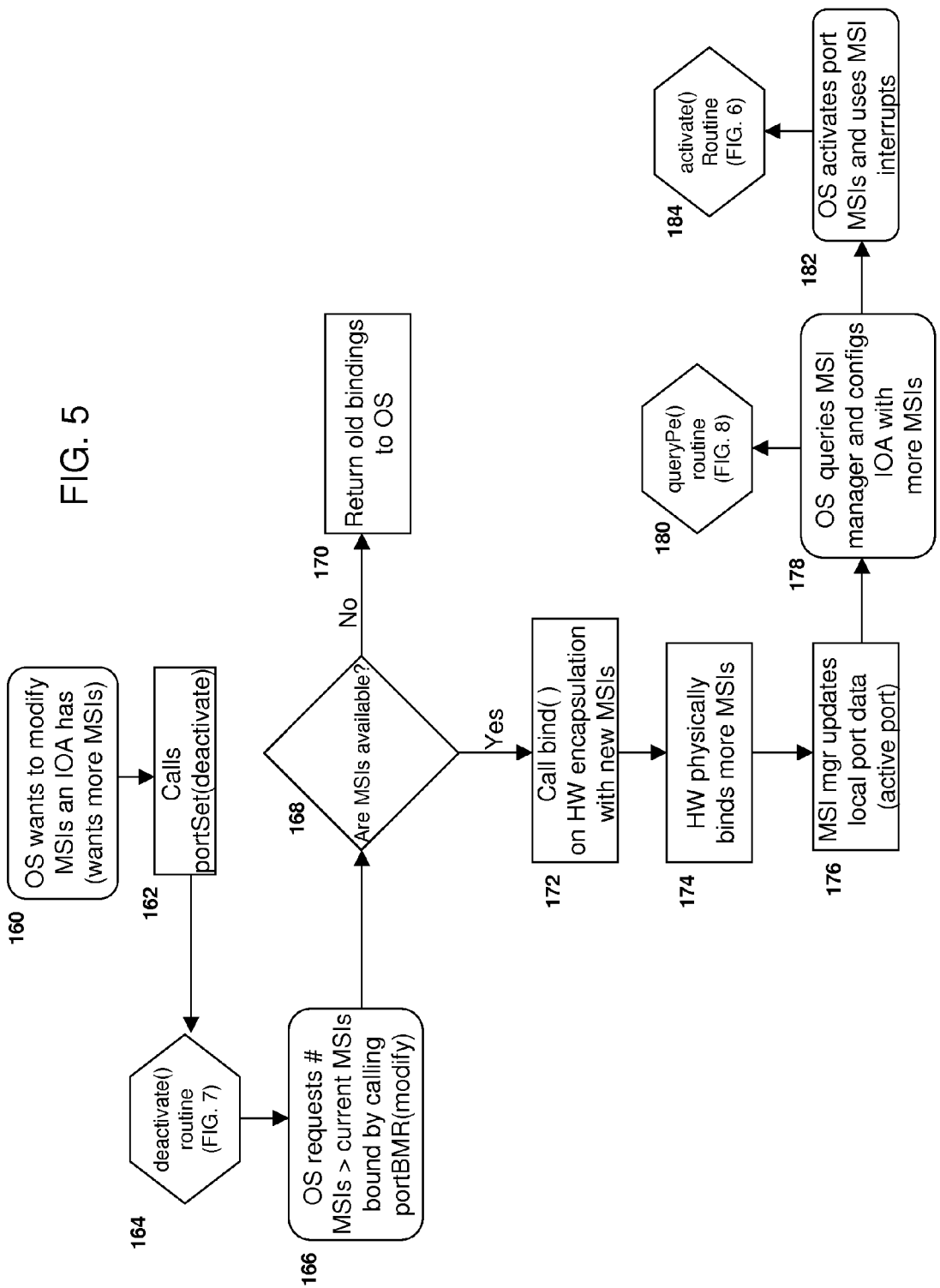
FIG. 5 is a flowchart illustrating the program flow of a modify routine capable of being executed by the computer of FIG. 1.

FIG. 5 illustrates the sequence of operations that occur in connection with a modify operation, in particular an operation requesting a greater number of MSI's. As shown in block 160, a modify operation is initiated when an operating system needs to modify bindings of MSI's for an IOA, such as when a hot plug replace occurs with a different IOA type. This begins by ensuring that the relevant port is deactivated, making a portSet(deactivate) call to the MSI manager in block 162 and initiating the execution of a deactivate routine that deactivates the port (block 164). The operation of the deactivate routine is described in greater detail below in connection with FIG. 7.

Next, with the logical port deactivated, the operating system requests a greater number of MSI's by calling a Hypervisor MSI service portBmr( ) call with the logical port it owns and the newly requested MSI's (block 166). The MSI manager then checks the authority of the operating system to the IOA and checks the available MSI's to modify (block 168). If not enough MSI's are available, the MSI manager returns the same amount of MSI's as before (block 170). Otherwise, it calls a hardware encapsulation class bind( ) routine with the MSI's requested for the physical port that is mapped to the operating system's logical port number in the call (block 172). The physical bindings are then made in the hardware (block 174), and control returns to the MSI manager to update the local MSI data for that operating system's port (block 176). Next, in block 178, the operating system queries the MSI manager by making a queryPe( ) call as shown in block 180 (which is described in greater detail below in connection with FIG. 8). The operating system may then configure the IOA with the new MSI binding information returned from the hypervisor query call. Next, in block 182 the operating system activates the MSI's for the port by calling an activate( ) routine as shown at block 184 (which is described in greater detail below in connection with FIG. 6). The operating system can then begin using the new MSI interrupts.

While a number of different routine call interfaces may be used consistent with the invention, one suitable interface for a MSI manager call to support bind/release/modify operations may be as follows:

```
int64 h_msi_port_bmr(uint64_t token, struct msi_port_bmr_parms*parms, uint64_t sizeof_parms)
```

The msi_port bmr_parms data structure may have the format as shown below in Table I:

TABLE I

| \multicolumn{4}{c}{msi_port_bmr_parms Format} | | | |
|---|---|---|---|
| Member Name | Member Type | IN/OUT | Description |
| slot_id | uint_32 | IN | Slot identifier |
| reserved | uint_8 | N/A | unused |
| bus_num | uint_8 | IN | PCI bus # (for bind & modify) |
| dev_num | uint_8 | IN | PCI dev # (for bind & modify) |
| func_num | uint_8 | IN | PCI func # (for bind & modify) |
| num_msi_requested | uint_32 | IN | Specifies the number of requested MSI interrupt numbers on bind operations; Specifying 0 means to release this MSI port from this bus/dev/func. |
| port_num | uint_16 | IN/OUT | Specifies the MSI port num on which to perform modify/release operations; this is the MVE identifier. Should be input as 0 on bind operations and is set by the hypervisor |
| message_data | uint_16 | N/AOUT | Message data used with DMA port_addr for selecting/indexing MSI's for that function. |
| port_addr | uint_64 | OUT | The MSI port address that the MSI's were bound to |
| num_msi_assigned | uint_32 | OUT | Result from the hypervisor of how many interrupts were actually bound/reassigned to this MSI port. |
| local_rc | uint_32 | OUT | Detail return code indicating additional error isolation values and defined by the hypervisor and having no specific semantics to a partition. |

The interface may support the return codes shown below in Table II:

TABLE II

| \multicolumn{3}{c}{Return Codes:} | | |
|---|---|---|
| Explicit | Detail | Description |
| H_SUCCESS | GEN_BASE_SUCCESS | Success |
| H_PRIVILEGE | GEN_PRIV_INVALID_ADDR | Bad buffer pointer |
| H_PRIVILEGE | GEN_PRIV_INVALID_LEN | Invalid buffer length |
| H_PARAMETER | GEN_INVALID_PARM_1 | Invalid slot_id, or slot not assigned to partition |
| H_PARAMETER | GEN_INVALID_PARM_2 | Invalid MSI port specification |
| H_HARDWARE | GEN_HARDWARE_ERROR | Any hardware error or attempt to modify an active MSI port for hardware that does not support dynamic modification of a port. |
| H_AUTHORITY | GENERAL_AUTHORITY | The slot LR DRC is not owned by the calling partition. |
| H_RESOURCE | GENERAL_RESOURCE_ERROR | No MSI resources available. |

The hypervisor applies the values passed in interrupt_range to a specified MSI port and returns the resulting interrupt number binding in the return value of interrupt_range. To collect the interrupt base value for a bind or modify, the call may be followed by an MSI Query PE call.

If the interrupt_range value passed is less than the currently established binding, the hypervisor reduces that binding to the next lower power of 2 value greater than or equal to the value passed and returns this result in interrupt_range. Interrupt numbers that exceed this reduced value are implicitly released and returned to the pool of MSI interrupts available on that PHB, and the partition's authority to utilize these MSI interrupts and any related resources (XIVE's) is removed for these interrupt numbers. That is, the partition authorities to the platform XIVE's associated with these released interrupts is implicitly removed.

If the interrupt_range value passed is greater than the currently established binding, the hypervisor attempts to increase that binding to the next higher power of 2 value greater than or equal to the value passed and returns this result in interrupt_range. If there are not sufficient available interrupt numbers to satisfy this request to extend this binding, the hypervisor does not modify the established binding and returns the established number of interrupts bound in the interrupt_range parameter.

If the hypervisor can increase the number of MSI interrupts associated with that MSI port, the hypervisor implicitly authorizes the partition's XIVE's associated with the additional interrupt numbers. That is, the partition is authorized to the platform interrupt numbers for XIVE's ranging from the established interrupt_base to that value plus the new interrupt_range value minus one. However, the partition must set these XIVE's to enable their use as interrupt vectors.

For a bind operation, if the port_num parameter is passed as zero, the hypervisor attempts to bind the interrupt_range number of MSI's to an available MSI port. If sufficient MSI resources are available, the hypervisor returns the MSI port number a port_num parameter, port address in the port_addr parameter, the number of MSI's bound in the interrupt_range parameter, and the starting, or base, platform interrupt number associated with that interrupt_range value (MSI number 0).

For a modify function, when the port_num parameter is passed as non-zero and num_msi_requested>0, the port_num parameter specifies the MSI MVE identifier of an established binding that the partition wishes to modify. If the port_num parameter passed does not match an MSI port bound for this, or the interrupt_range value passed for a port that is bound for this partition, the hypervisor returns H_Parameter and rejects the operation. If the MSI port is activated at the time of this call, and the hardware does not permit dynamic modification of MVE's, the hypervisor rejects this call with the h_hardware return code value.

For a release function, if the port_num parameter is passed as non-zero and the num_msi_requested=0, the port_num parameter specifies the MSI MVE identifier of an established binding that the partition wishes to release. If the port_num parameter passed is zero or does not match a port bound to MSI's for this partition the hypervisor returns H_Parameter and suppresses the operation. Otherwise, the hypervisor releases the MSI port and MSI interrupt numbers associated with this port address.

As part of releasing an MSI resource, the hypervisor first disables the associated XIVR's, if not already disabled, and then disables the port. The partition authority to the XIVR's that had been bound to this port is implicitly rescinded upon completion of this call. All hypervisor records of this port binding are then cleared.

In general, the hypervisor may initialize an MVE with associated bound interrupt numbers in a deactivated state. The deactivated state renders an MSI port unresponsive to DMA operations targeting that address, and the IOA receives Master Abort on the PCI bus while the port is in deactivated state. The partition activates the port after it is bound, either explicitly with the hypervisor call, or if implicitly bound from a prior partition activation. Activating an MSI port both enables the PHB hardware to respond to the MSI port address as the target of a DMA, and defines the range of valid sub-bus, device, and function numbers that may signal MSI's on this port address.

Figure 6:
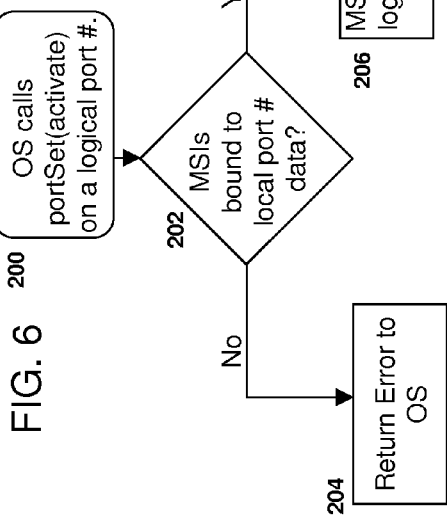
FIG. 6 is a flowchart illustrating the program flow of an activate routine capable of being executed by the computer of FIG. 1.

As noted above, a second type of call includes activate and deactivate operations, which are used to dynamically activate or deactivate MVE's or MSI ports. FIG. 6, for example, illustrates the sequence of operations that may occur in connection with an activate operation. As shown in block 200, an activate operation is initiated by an operating system needing to activate a logical port by making a portSet(activate) call to the MSI manager, specifying a logical port to be activated. Next, in block 202, the MSI manager determines if the operating system owns the port and the port is bound to MSI's. If either of these conditions is not true, the MSI manager returns an error to the operating system (block 204). Otherwise, control passes to block 206, where the MSI manager resolves the logical port of the operating system, and then to block 208 to access the hardware encapsulation class by calling an activate( ) routine with the resolved port number. As a result of this call, the hardware encapsulation class physically activates the resolved port by setting the MSI port hardware register to active (block 210). The hardware encapsulation class then returns to the MSI manager, which then updates the local port information to indicate that the port is now active (block 212), and returns to the operating system.

Figure 7:
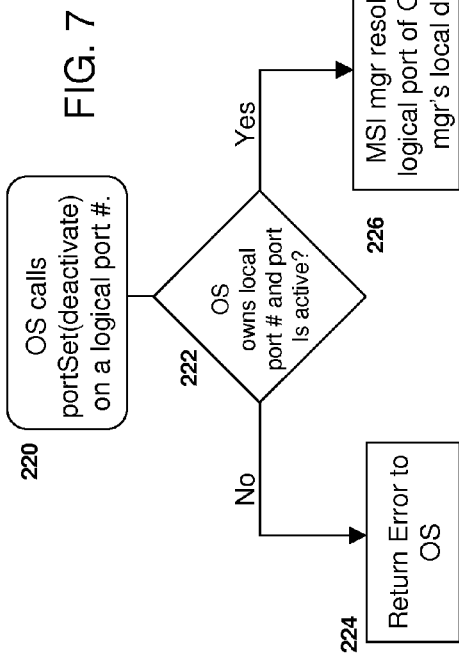
FIG. 7 is a flowchart illustrating the program flow of a deactivate routine capable of being executed by the computer of FIG. 1.

FIG. 7 illustrates the sequence of operations that occur in connection with a deactivate operation. As shown in block 220, a deactivate operation is initiated by an operating system needing to deactivate a logical port by making a portSet (deactivate) call to an MSI manager, specifying a logical port to be deactivated. Next, in block 222, the MSI manager determines if the operating system owns the port and the port is active. If either of these conditions is not true, the MSI manager returns an error to the operating system (block 224). Otherwise, control passes to block 226, where the MSI manager resolves the logical port of the operating system, and then to block 228 to access the hardware encapsulation class by calling a deactivate( ) routine with the resolved port number. As a result of this call, the hardware encapsulation class physically deactivates the resolved port by setting the MSI port hardware register to inactive (block 230). The hardware encapsulation class then returns to the MSI manager, which then updates the local port information to indicate that the port is now inactive (block 232), and returns to the operating system.

While a number of different routine call interfaces may be used consistent with the invention, one suitable interface for a MSI manager call to support activate/deactivate operations may be as follows:

```
int64 h_msi_port_set(uint64_t token, struct
    msi_port_set_parms*parms, uint64_t sizeof_parms)
```

The msi_port_set_parms data structure may have the format as shown below in Table III:

TABLE III msi_port_set_parms Format

| Member Name | Member Type | IN/OUT | Description |
|---|---|---|---|
| operation | uint_32 | IN | 1 = Activate MSI resources<br>2 = Deactivate MSI resources |
| slot_id | uint_32 | IN | Corresponds to slot LR DRC from PFDS, to identify slot on which this action will operate. |
| port_num | uint_16 | IN | Specifies the MSI port on which to perform modify/release, activate, or deactivate operations; receives the assigned port on bind operations. This is the MVE identifier. |
| reserved | uint_16 | N/A | unused |
| local_rc | uint_32 | OUTPUT | Detail return code indicating additional error isolation values and defined by the hypervisor and having no specific semantics to a partition. |

The interface may support the return codes shown below in Table IV:

TABLE IV

Return Codes:

| Explicit | Detail | Description |
|---|---|---|
| H_SUCCESS | GEN_BASE_SUCCESS | Success |
| H_PRIVILEGE | GEN_PRIV_INVALID_ADDR | Bad buffer pointer |
| H_PRIVILEGE | GEN_PRIV_INVALID_LEN | Invalid buffer length |
| H_PARAMETER | GEN_INVALID_PARM_1 | Invalid slot_id, or slot not assigned to partition |
| H_PARAMETER | GEN_INVALID_PARM_2 | Invalid MSI port specification |
| H_HARDWARE | GEN_HARDWARE_ERROR | Any hardware error or attempt to modify an active MSI port for hardware that does not support dynamic modification of a port. |
| H_AUTHORITY | GENERAL_AUTHORITY | The slot LR DRC is not owned by the calling partition. |

With this call, a partition can tell the hypervisor to deactivate an MSI port. A partition deactivates a port as part of platform operations that may change the MSI allocation to a device, such as DLPAR or hot plug (slot concurrent maintenance) operations, installing new device drivers, and so forth. Additionally, if the hardware requires it, the platform may need to deactivate an MSI port to modify the interrupt number range or bus/device/function validation parameters.

A third type of call includes a query operation, which supports the retrieval of logical information about the current MSI availability and bindings. For example, in many embodiments, it is desirable for a query operation to return to a client information such as a port index used to identify that port among a possible plurality of ports in that PHB, the PCI bus address of that port as a DMA target, the PCI MSI data base value (e.g., a power of 2 multiple that the client uses to determine the function message data value to program into an IOA), the number of interrupts actually bound to the port, and the starting system interrupt number (e.g., the platform wide ID of the particular XIVR on that PHB) associated with those interrupts. Once an MSI manager has bound MSI interrupts to a port, a client is then free to allocate these bindings to function configuration spaces it controls in any combination that meets the PCI MSI architecture.

Figure 8:
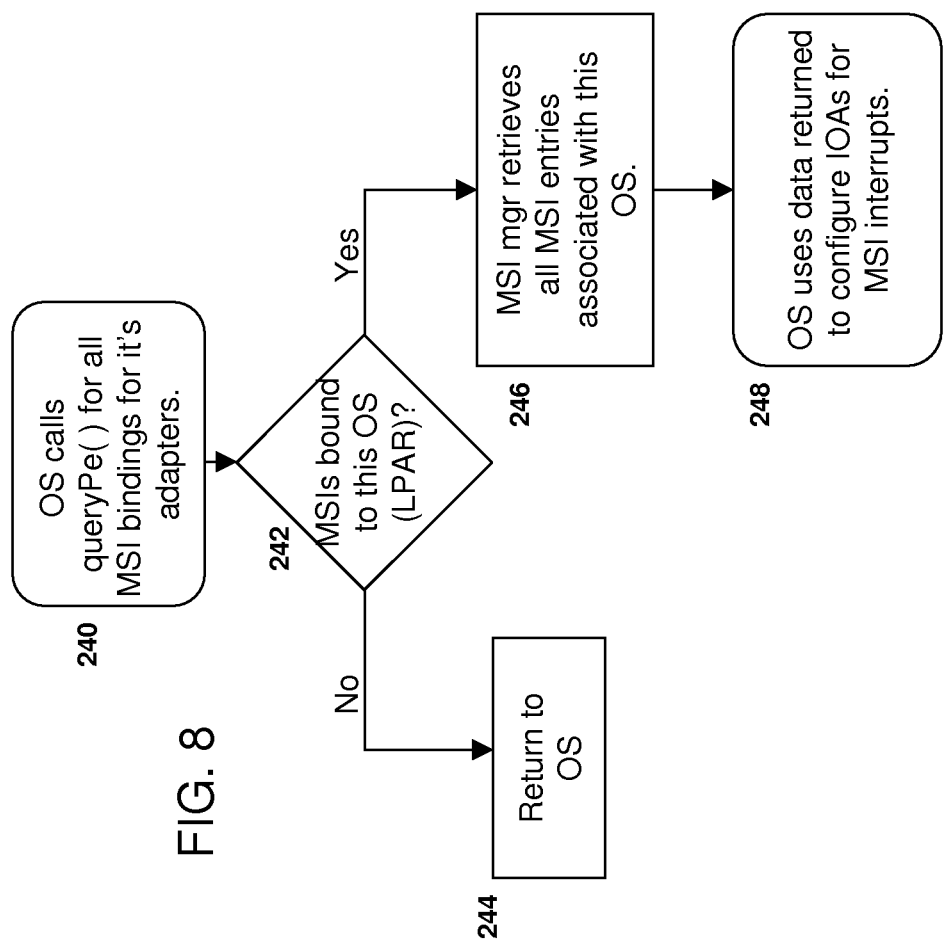
FIG. 8 is a flowchart illustrating the program flow of a query routine capable of being executed by the computer of FIG. 1.

FIG. 8 illustrates an exemplary sequence of operations that may occur in connection with a query operation. As shown in block 240, a query operation is initiated by an operating system needing to query an MSI manager for all MSI bindings for the IOA's owned by the operating system, by making a queryPe( ) call to an MSI manager and specifying its LPAR index. Next, in block 242, the MSI manager checks the calling operating system has MSI's bound to it, and returns to the operating system if no such bindings exist (block 244). Otherwise, the MSI manager retrieves all MSI binding entries with all DMA address info, starting system interrupt number, logical port for each entry, and all MSI's bound to the ports (block 246). The operating system then uses this data returned to configure an IOA to use MSI interrupts, or for other purposes as appropriate, during runtime (block 248).

While a number of different routine call interfaces may be used consistent with the invention, one suitable interface for a MSI manager call to support a query operation may be as follows:

```
int64 h_msi_query_pe(uint64_t token, struct
    msi_query_pe_parms*parms, uint64_t sizeof_parms)
```

The msi_query_pe_parms data structure may have the format as shown below in Table V:

TABLE V msi_query_pe_parms Format

| Member Name | Member Type | IN/OUT | Description |
|---|---|---|---|
| slot_id | uint_32 | IN | Corresponds to slot LR DRC from PFDS, to identify slot on which this action will operate. |
| buff_len | uint_32 | IN | Specifies the length of the buffer PFW is providing. |
| buff_ptr | uint_64_t | IN | Specifies addr in PFW memory where MSI_info_structs are to be copied into. |
| num_msi_entries | uint_32 | OUT | Number of MSI_info_structs returned. |
| local_rc | uint_32 | OUT | Detail return code indicating additional error isolation values and defined by the hypervisor and having no specific semantics to a partition. |

The query operation returns one or more an MSI_info_struct data structures to the client, which may have the format as shown below in Table VI:

TABLE VI

MSI_info_struct Format

| Member name | Type | Description |
|---|---|---|
| port_addr | uint_64 | The MSI port addr (MVE), used in other MSI calls |
| bit_flags | uint_8 | Described below |
| bus_num | uint_8 | PCI bus # the MVE is registered to |
| dev_num | uint_8 | PCI dev # the MVE is registered to |
| func_num | uint_8 | PCI func # the MVE is registered to |
| starting_int | uint_32 | The platform interrupt # for the "MSI 0" under this MVE |
| int_range | uint_32 | Number of interrupts under this MVE, zero indicates no interrupts bound to this MVE |
| port_num | uint_16 | The logical MSI port # required by PHYP to access the MSI port. This is the MVE identifier. |
| reserved | | Keep structure multiple of 0x8 bytes |
| message_data | uint_16 | Message data used with DMA port_addr for selecting/indexing MSI's for that function. |

In addition, each MSI_info_struct data structure has a bit_flags field, which may have the format as shown below in Table VII:

TABLE VII

Bit_flags Format

| BIT FLAG name | Value | Definition |
|---|---|---|
| MSI-BOUND | 0x1 | MSI port is bound to a particular bus/dev/func |
| MSI-ACTIVE | 0x2 | MSI port is activated |
| MSI-RESERVED | 0x4 | MSI port is tied to this Partitionable Endpoint |
| reserved | 0x8-0x80 | Reserved for future use |

The interface may support the return codes shown below in Table VIII:

TABLE VIII

Return Codes:

| Explicit | Detail | Description |
|---|---|---|
| H_SUCCESS | GEN_BASE_SUCCESS | Success |
| H_PRIVILEGE | GEN_PRIV_INVALID_ADDR | Bad buffer pointer |
| H_PRIVILEGE | GEN_PRIV_INVALID_LEN | Invalid buffer length |
| H_PARAMETER | GEN_INVALID_PARM_1 | Invalid slot_id, or slot not assigned to partition, or slot does not support MSI.. |
| H_PARAMETER | GEN_INVALID_PARM_2 | Invalid MSI_info buffer length |
| H_PARAMETER | GEN_INVALID_PARM_3 | MSI_info buffer address too small, or the buffer is not initialized to 0s.. |
| H_HARDWARE | GEN_HARDWARE_ERROR | Any hardware error or attempt to modify an active MSI port for hardware that does not |

TABLE VIII-continued

Return Codes:

| Explicit | Detail | Description |
| --- | --- | --- |
| | | support dynamic modification of a port. |
| H_AUTHORITY | GENERAL_AUTHORITY | The slot LR DRC isn not owned by the calling partition. |

The h_msi_query_pe call allows a partition to obtain information on the MSI ports bound to a particular Partitionable Endpoint (PE). A structure is required for each MSI-capable PCI function under a Partitionable Endpoint, so a buffer of at least 4*sizeof (MSI_info_struct) should be provided. There are no ordering assumptions regarding the array of structures copied into the partition firmware buffer. Partition firmware searches through each structure for the correct MSI port number that is desired.

The MSI-BOUND and MSI-ACTIVE bit flags may be directly manipulated by other MSI calls. The MSI-RESERVED flag may be used when a need arises to statically bind MSI resources to a particular PE's between boots, e.g., when there are not enough MSI resources to go around for all the partitionable endpoints under a PHB.

Figure 9A:
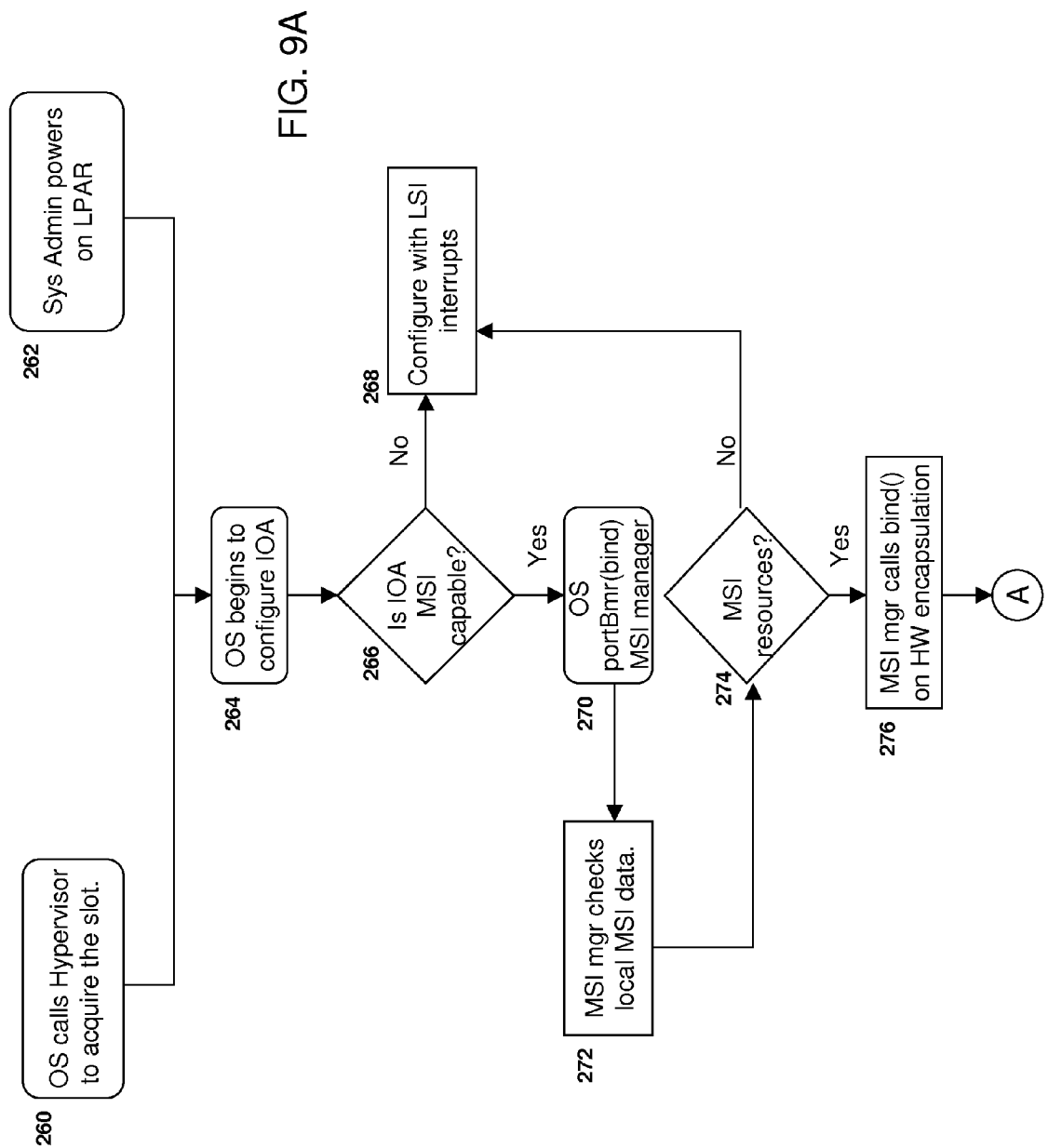
FIGS. 9A and 9B are flowcharts illustrating the program flow of an initialization routine capable of being executed by the computer of FIG. 1.
Figure 9B:
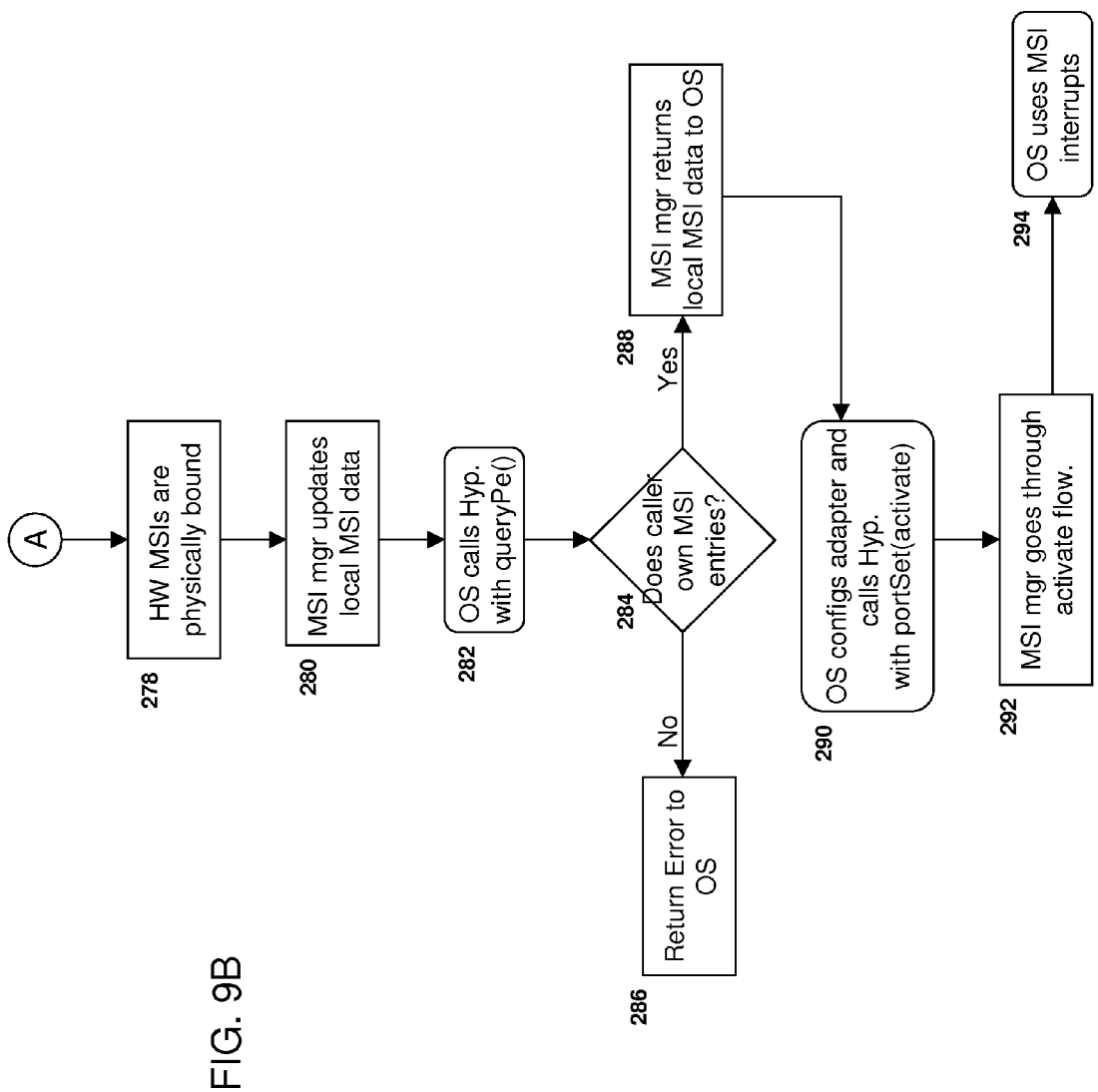

FIGS. 9A and 9B next illustrate the program flow of an initialization routine capable of being executed by the computer of FIG. 1 to configure an IOA, and utilizing the various calls described above to implement dynamic binding of MSI resources to an interrupt facility. The routine is illustrated with two potential start points 260, 262, respectively representing an operating system calling a hypervisor to acquire a particular slot, and a system administrator powering on or otherwise initializing a logical partition.

Irrespective of the start point, the routine begins in block 264 with the operating system in the logical partition beginning to configure an IOA. In this block, operations such as IOA configuration register reads and writes such as are associated with PCI bus probing, configuring bridges and secondary busses, and parsing the PCI capability structure chain under each PCI function may be performed.

Next, in block 266 the partition operating system determines whether the IOA is MSI capable. If not, control passes to block 268 to configure the IOA in a conventional manner to use LSI interrupts. Otherwise, control passes to block 270, where the partition operating system makes a port_bmr(bind) call to the MSI manager to initiate a bind operation with the MSI manager. Normally, the OS will request the number of MSI interrupts corresponding to the IOA's MSI/MSI-X capability structure's maximum number of MSI interrupts, but the OS may request less as circumstances require.

Next, in block 272, the MSI manager checks the local MSI data for its associated PHB, and control passes to block 274 to determine whether any MSI resources are available. If no MSI resources are available, control passes to block 268 to configure the IOA to use LSI interrupts. Otherwise, control passes to block 276, where the MSI manager makes a bind( ) call to the hardware encapsulation program, which results in the hardware encapsulation program physically binding the appropriate MSI resources (block 278). Next, in block 280 the MSI manager updates its local MSI data.

Next, in block 282, the partition operating system makes a queryPe( ) call to the MSI manager, which then determines whether the caller owns any MSI entries (i.e., whether the caller owns any MSI bindings). If not, an error is returned to the caller in block 286. Otherwise, control passes to block 288, where the MSI manager returns its local MSI data to the partition operating system.

Next, in block 290, the partition operating system configures the IOA and makes a portSet(activate) call to activate the port(s) bound to the MSI resources used by the IOA. The MSI manager then proceeds through the activate flow described above in connection with FIG. 6. Once the port(s) have been activated, the partition operating system can then begin using the MSI interrupts, as appropriate (block 294).

As an example of the configuration of an IOA in the manner described above, consider an eight function IOA requiring one interrupt per function. The configuration of the IOA would be initiated by the partition operating system or the device driver therein requesting the MSI manager to bind 8 MSI's to one port. The partition operating system would then set the message address for each function to that one port address, and set the MME field to '000'b in each function. The partition operating system would then set the message data field in function 0 to '0x00', in function 1 to '0x01', and so on, programming each function message data with a unique integer value in the range 0x00 to 0x07. In contrast, for a two function IOA with two interrupts per function, the partition operating system would request the MSI manager to bind 4 MSI's to one port. The partition operating system would then set the message address in each function to that one port address, set the MME field to '001'b in each function (2 interrupts), and set the message data field in function 0 to '0x00', in function 1 to '0x02', and so on. In either case, the partition operating system would then manage each function's interrupt using the XIVR's that correlate to the starting system interrupt number of the port plus the MSI interrupt numbers programmed into that function's message data register.

As noted above, in some embodiments of the invention, the MSI manager is platform independent, and interfaced with the underlying hardware platform through a hardware encapsulation program. In this regard, the hardware encapsulation program is capable of dynamically creating an MSI manager during initialization of a PHB or root complex, typically via instantiating an object of an MSI manager class. In addition, to initialize the MSI manager with the appropriate details regarding the underlying hardware platform, the hardware encapsulation program desirably provides a set of abstract parameters to the MSI manager in the form of call parameters supplied to a constructor method for the MSI manager class.

Some embodiments consistent with the invention may alternatively implement an MSI manager as a set of program function calls and not have an objected-oriented class structure or class constructor. Such alternative embodiments may instead provide the MSI manager abstractions of the hardware MSI properties and capabilities as data structures that are accessed by such function calls to provide the MSI manager client operations. Other mechanisms for abstracting the hardware will be apparent to one of ordinary skill in the art having the benefit of the instant disclosure. Some embodiments may also provide multiple instances of MSI managers, e.g., with each MSI manager being associated individually with a particular MSI port address and MSI interrupts that can be bound to that port, according to the hardware MSI capabilities and constructor abstractions thereof. In other embodiments, a single MSI manager, having a plurality of MSI port and MSI interrupt combinations that can be bound together according to hardware MSI capabilities and having a plurality of constructor abstractions thereof, may instead be used.

The abstract parameters may vary in different embodiments, and consistent with the embodiment of FIG. 2B, may include parameters such as the number of MSI ports for a PHB or root complex, the number of MSI's for a PHB or root complex, the number of MSI's for a particular slot managed by the PHB or root complex, the number of partitionable endpoints or slots that can be assigned to an MSI port, port addresses of each MSI port that can be combined with MSI's at that PHB, the starting platform interrupt number of the first MSI amongst all sequential MSI's that can be bound to the MSI ports, the starting MSI message data value of the first MSI amongst all sequential MSI's that can be bound to the MSI ports, etc. It will be apparent to one skilled in the art having the benefit of the instant disclosure how to create constructor parameters to provide an abstraction of the port attribute parameters to create MSI Manager internal tables, e.g., as illustrated in FIG. 2B, as well as how to create parameters lists that enable an MSI Manager to administer a plurality of MSI ports and MSI interrupts, as opposed to parameters describing a single MSI port.

Embodiments consistent with the invention address a number of problems plaguing conventional designs. For example, such embodiments support the definition of an abstract and portable interface between an operating system or device driver software and host firmware. Such embodiments also are capable of defining host firmware policies to administer highly variable configurations of PHB MSI facilities based on PHB, adapter, and logical partition configuration in a manner that is abstract and transparent to the operating system and device driver. Such embodiments also are capable of dynamically sharing pools of MSI resources among a plurality of client programs, such as device drivers, and IOA's also sharing a PHB. Such embodiments also are capable of defining an abstraction of hardware facilities to enable MSI management/administration to be independent of the particular hardware design, such that the MSI administrative functions and interfaces to the operating system and device driver software are directly portable to other hardware platforms, with little or no modifications. In addition, such embodiments are capable of defining MSI states and policies for error recovery, concurrent maintenance, partition reboots, and logical partition dynamic resource management affecting adapters.

Exemplary host firmware policies include administering MSI resource bindings so as to insure that partitions rebooting, or partitions that are powered off and later powered back on with the same IOA resources, are able to also re-establish prior bindings. These policies insure that a partition is able to re-configure adapters with MSI resources consistently each partition boot, irrespective of the MSI bindings of other partitions or adapters sharing the MSI hardware facilities. Embodiments consistent with the invention will benefit from the hardware independence and portability of the MSI manager to encapsulate such policies.

Host firmware policies may also include representing the MSI resources of the complete hardware platform to all logical partitions as virtual MSI hardware resources. Such embodiments would benefit from the hardware independence and portability of the MSI manager to encapsulate policies determining which of the actual hardware MSI resources are represented to any one logical partition among a plurality of logical partitions sharing the MSI hardware of a platform.

Embodiments consistent with the invention may also provide abstract hardware encapsulation interfaces to an MSI manager, e.g., to represent primitive operations that are suitable for configuring and activating MSI hardware resources but that are independent of the specific hardware register and sequencing implementation of any particular platform. Such embodiments may also programmatically associate the hardware encapsulation interfaces directly with the MSI manager client interfaces, omitting a true MSI manager object while having effectively the functionality of an MSI manager. Such embodiments suffer the disadvantages of not having an abstract and portable MSI manager object, but would nonetheless provide an abstract MSI client interface and benefit in the implementation of such client interfaces from the abstraction of the hardware interfaces.

Various modifications to the herein-described embodiments will be apparent to one of ordinary skill in the art having the benefit of the instant disclosure. For example, while a number of embodiments discussed herein support PCI power of 2 sets of MSI's mapped to a port, it would be appreciated by one of ordinary skill in the art that MSI interrupt numbers may be bound to an MSI port in sets that are not power of 2, but rather an arbitrary number requested by a client, and that the MSI manager may be modified to bind and administer mappings of multiple MSI's to an MSI port in which the range of interrupts is not limited to only power of 2 multiples.

Additional modifications may be made to the illustrated embodiments without departing from the spirit and scope of the invention. Therefore, the invention lies in the claims hereinafter appended.

What is claimed is:

1. A method of managing message-signaled interrupt (MSI) resources in a computer of a type including a hardware platform, wherein the hardware platform comprises hardware that manages at least one MSI resource for at least one Input/Output Adapter (IOA) disposed in an Input/Output (IO) fabric, the method comprising:
managing a plurality of MSI bindings in the computer using a platform independent interrupt manager, wherein each MSI binding maps at least one MSI resource supported by the hardware platform with an interrupt facility resident in the computer; and
interfacing the platform independent interrupt manager with the hardware platform of the computer through platform-specific encapsulation program code, wherein the platform-specific encapsulation program code exposes programming functions to the platform independent interrupt manager and provides the platform independent interrupt manager with abstract parameters that describe MSI hardware capabilities of the hardware platform, and wherein the platform independent interrupt manager manages the plurality of MSI bindings using the programming functions and abstract parameters.

2. The method of claim 1, further comprising initializing the interrupt manager with at least one abstract parameter representing an MSI capability of the hardware platform.

3. The method of claim 2, wherein initializing the interrupt manager comprises instantiating the interrupt manager using a constructor method, wherein the abstract parameter is provided as a parameter to the constructor method.

4. The method of claim 3, wherein the hardware platform includes a host bridge configured to manage a plurality of MSI resources, and wherein the interrupt manager is dedicated to the host bridge to manage bindings for the plurality of MSI resources.

5. The method of claim 1, wherein hardware platform supports a shared pool of MSI resources that are shared by a plurality of clients, the method further comprising dynamically creating an MSI binding in response to a client request, wherein the client is selected from the group consisting of an operating system, firmware, and a device driver.

6. The method of claim 5, wherein the hardware platform hosts a non-partitioned environment.

7. The method of claim 5, wherein the hardware platform hosts a logically-partitioned environment, and wherein the client is resident in a logical partition.

8. The method of claim 5, further comprising dynamically releasing the MSI binding in response to an unbind request from a client.

9. The method of claim 5, further comprising dynamically increasing or decreasing the number of MSI resources in an existing binding in response to a modify request from a client.

10. The method of claim 5, further comprising providing configuration data for the shared pool of MSI resources in response to a query request from a client, wherein the configuration data includes, for the MSI binding, a port address for an MSI port in the interrupt facility to which an MSI resource is bound, a port number for the MSI port, a port status, a starting interrupt number for the MSI resource, and a number of MSI interrupts mapped to the MSI port.

11. The method of claim 5, wherein the MSI binding binds an MSI resource with a port, the method further comprising dynamically activating the port in response to an activate request from a client.

12. The method of claim 11, further comprising dynamically deactivating the port in response to a deactivate request from a client.

13. The method of claim 5, further comprising deactivating and releasing MSI bindings for a partition when terminating the partition.

14. The method of claim 1, wherein the platform independent interrupt manager is accessible by a plurality of clients and further includes a client-independent interface accessible by a client from among the plurality of clients.

15. An apparatus, comprising
a hardware platform comprising hardware that manages at least one message-signaled interrupt (MSI) resource for at least one Input/Output Adapter (IOA) disposed in an Input/Output (IO) fabric, the hardware platform including an interrupt facility;
a plurality of MSI resources;
a platform independent interrupt manager configured to manage a plurality of MSI bindings, wherein each MSI binding maps at least one MSI resource supported by the hardware platform with the interrupt facility; and
platform-specific encapsulation program code configured to interface the platform independent interrupt manager with the hardware platform, wherein the platform-specific encapsulation program code exposes programming functions to the platform independent interrupt manager and provides the platform independent interrupt manager with abstract parameters that describe MSI hardware capabilities of the hardware platform, and wherein the platform independent interrupt manager manages the plurality of MSI bindings using the programming functions and abstract parameters.

16. The method of claim 15, wherein the encapsulation program code is configured to initialize the interrupt manager with at least one abstract parameter representing an MSI capability of the hardware platform.

17. The method of claim 16, wherein the encapsulation program code is configured to initialize the interrupt manager by instantiating the interrupt manager using a constructor method, wherein the abstract parameter is provided as a parameter to the constructor method.

18. The method of claim 17, wherein the hardware platform includes a host bridge configured to manage a plurality of MSI resources, and wherein the interrupt manager is dedicated to the host bridge to manage bindings for the plurality of MSI resources.

19. The method of claim 15, wherein the plurality of MSI resources comprises a shared pool of MSI resources shared by a plurality of clients, wherein the interrupt manager is configured to dynamically create an MSI binding in response to a client request, and wherein the client is selected from the group consisting of an operating system, firmware, and a device driver.

20. The method of claim 19, wherein the hardware platform hosts a non-partitioned environment.

21. The method of claim 19, wherein the hardware platform hosts a logically-partitioned environment, and wherein the client is resident in a logical partition among a plurality of logical partitions sharing hardware platform resources.

22. The method of claim 19, wherein the interrupt manager is configured to dynamically release the MSI binding in response to an unbind request from a client.

23. The method of claim 19, wherein the interrupt manager is further configured to dynamically increase or decrease the number of MSI resources in an existing binding in response to a modify request from a client.

24. The method of claim 19, wherein the interrupt manager is configured to provide configuration data for the shared pool of MSI resources in response to a query request from a client, wherein the configuration data includes, for the MSI binding, a port address for an MSI port in the interrupt facility to which an MSI resource is bound, a port number for the MSI port, a port status, a starting interrupt number for the MSI resource, and a number of MSI interrupts mapped to the MSI port.

25. The method of claim 19, wherein the MSI binding binds an MSI resource with a port, wherein the interrupt manager is configured to dynamically activate the port in response to an activate request from a client.

26. The method of claim 25, wherein the interrupt manager is configured to dynamically deactivate the port in response to a deactivate request from a client.

27. The method of claim 15, wherein the platform independent interrupt manager is accessible by a plurality of clients and further includes a client-independent interface accessible by a client from among the plurality of clients.

28. A program product, comprising:
program code configured upon execution to manage message-signaled interrupt (MSI) resources in a computer of the type including a hardware platform by managing a plurality of MSI bindings in the computer using a platform independent interrupt manager and interfacing the platform independent interrupt manager with the hardware platform of the computer through platform-specific encapsulation program code, wherein each MSI binding maps at least one MSI resource supported by the hardware platform with an interrupt facility resident in the computer, wherein the hardware platform comprises hardware that manages at least one MSI resource for at least one Input/Output Adapter (IOA) disposed in an Input/Output (IO) fabric, wherein the platform-specific encapsulation program code exposes programming functions to the platform independent interrupt manager and provides the platform independent interrupt manager with abstract parameters that describe MSI hardware capabilities of the hardware platform, and wherein the platform independent interrupt manager manages the plurality of MSI bindings using the programming functions and abstract parameters; and a recordable medium storing the program code.

\* \* \* \* \*